United States Patent [19]

Burton

[11] Patent Number: 4,803,412

[45] Date of Patent: Feb. 7, 1989

[54] PROGRAMMABLE ELECTRONIC ANTENNA ROTATOR

[75] Inventor: Larry W. Burton, Hurdle Mills, N.C.

[73] Assignee: Avnet, Inc., Ellenville, N.Y.

[21] Appl. No.: 68,634

[22] Filed: Jun. 30, 1987

[51] Int. Cl.$^4$ ............................................. G05B 19/10
[52] U.S. Cl. .................................... 318/567; 318/600; 318/565
[58] Field of Search ................ 318/567, 600, 565, 664

[56] References Cited

U.S. PATENT DOCUMENTS

| | | | |
|---|---|---|---|
| 4,072,886 | 2/1978 | Dammeyer | 318/602 |
| 4,352,202 | 9/1982 | Carney | 455/151 |
| 4,496,890 | 1/1985 | Wurdack et al. | 318/600 |

*Primary Examiner*—William M. Shoop, Jr.
*Assistant Examiner*—Saul M. Bergmann
*Attorney, Agent, or Firm*—Darby & Darby

[57] ABSTRACT

A method and apparatus for rotating an antenna, including a keypad is used to first program a controller for storing a plurality of individually selectable positions for the antenna, a particular key of the keypad representing a programmed position for the antenna, whereafter programming the keys of the keypad are individually depressed for commanding the controller to operate a motor driven rotator for moving the antenna in a clockwise or counterclockwise direction to the position associated with the momentarily depressed key. Also, visual indicators are arranged in a compass configuration for indicating the positioning of the antenna as it rotates, and selectively indicating the rest position of the antenna.

11 Claims, 12 Drawing Sheets

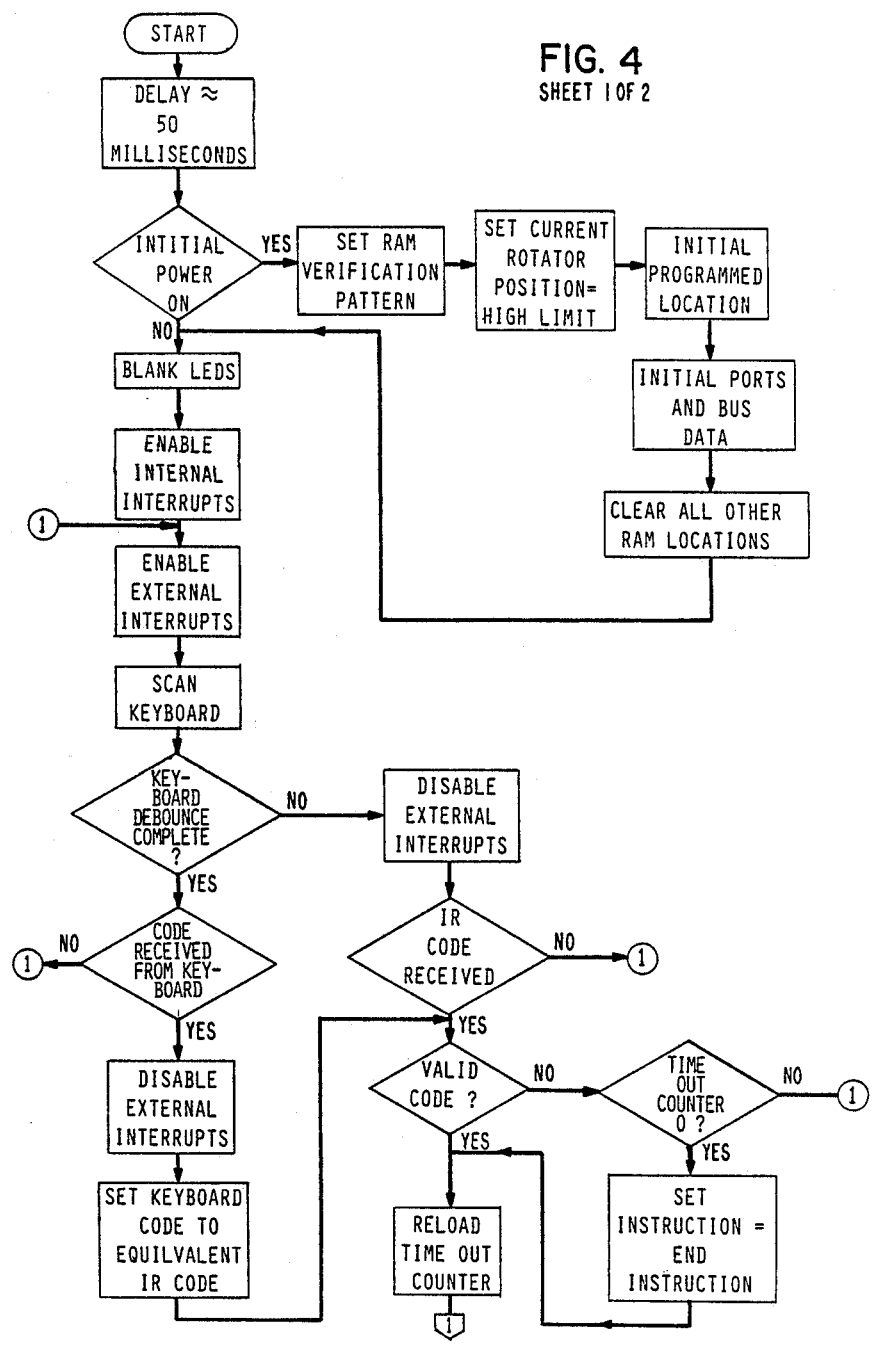

SHEET 3 OF 3

PROGRAMMABLE ELECTRONIC ANTENNA ROTATOR

FIELD OF THE INVENTION

The field of the present invention relates generally to methods and apparatus for rotating an antenna, such as a TV antenna, and more particularly to such methods and apparatus for providing automatic positioning of an antenna to any one of a plurality of previously determined positions.

BACKGROUND OF THE INVENTION

The function of antenna rotators is typically to position an off air antenna in a desired direction. This is typically accomplished by attaching a motor (hereinafter referred to as a rotator or motor) to the base of the antenna mast, and applying current to the motor with such a phase relationship so as to move the motor in the desired direction. The motor controlling device, usually located indoors, determines the appropriate phase and duration of current based upon input from the consumer or user.

SUMMARY OF THE INVENTION

An object of the invention is to provide an improved antenna rotator.

Another object of the invention is to provide a new and improved method and apparatus for preselecting a plurality of antenna positions, any one of which can then be subsequently chosen for automatically moving the antenna to that position.

Yet another object of the invention is to provide a method and apparatus for both initial programming, and subsequent reprogramming if desired, of various selectable positions to which an antenna may be automatically rotated.

These and other objects are obtained with the present new and improved method and apparatus for rotating an antenna including a keypad means addressable for initially selectively holding down either a clockwise ("CW") button or counterclockwise ("CCW") button of the keyboard means for operating a motor to rotate an antenna to one of a plurality of desired locations, when each location is reached, momentarily stopping the rotation to press a programming button to program a microprocessor, for subsequently moving the antenna automatically to a given location whenever the button of the keypad means uniquely associated with that location via the previous programming is momentarily depressed. The microprocessor drives indicator means for indicating the positions the antenna has attained as it is moved from one position or location to another.

BRIEF DESCRIPTION OF THE DRAWINGS

The various embodiments of the inventor will be described with reference to the following drawings in which like items are indicated by the same reference number.

DESCRIPTION OF THE PREFERRED EMBODIMENTS

Figure 1:
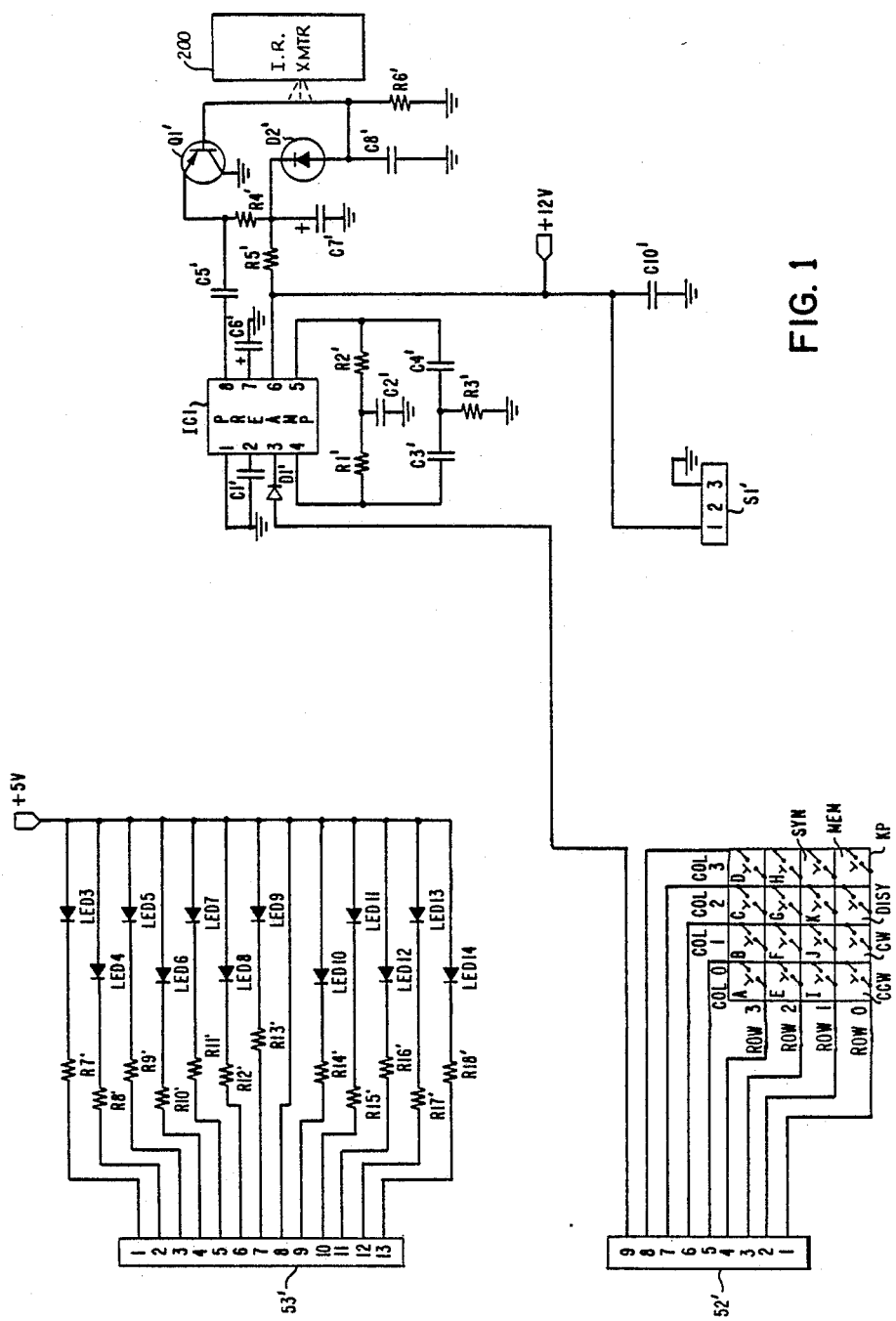
FIG. 1 is a circuit schematic diagram of a display printed circuit board for one embodiment of the invention.
Figure 2:
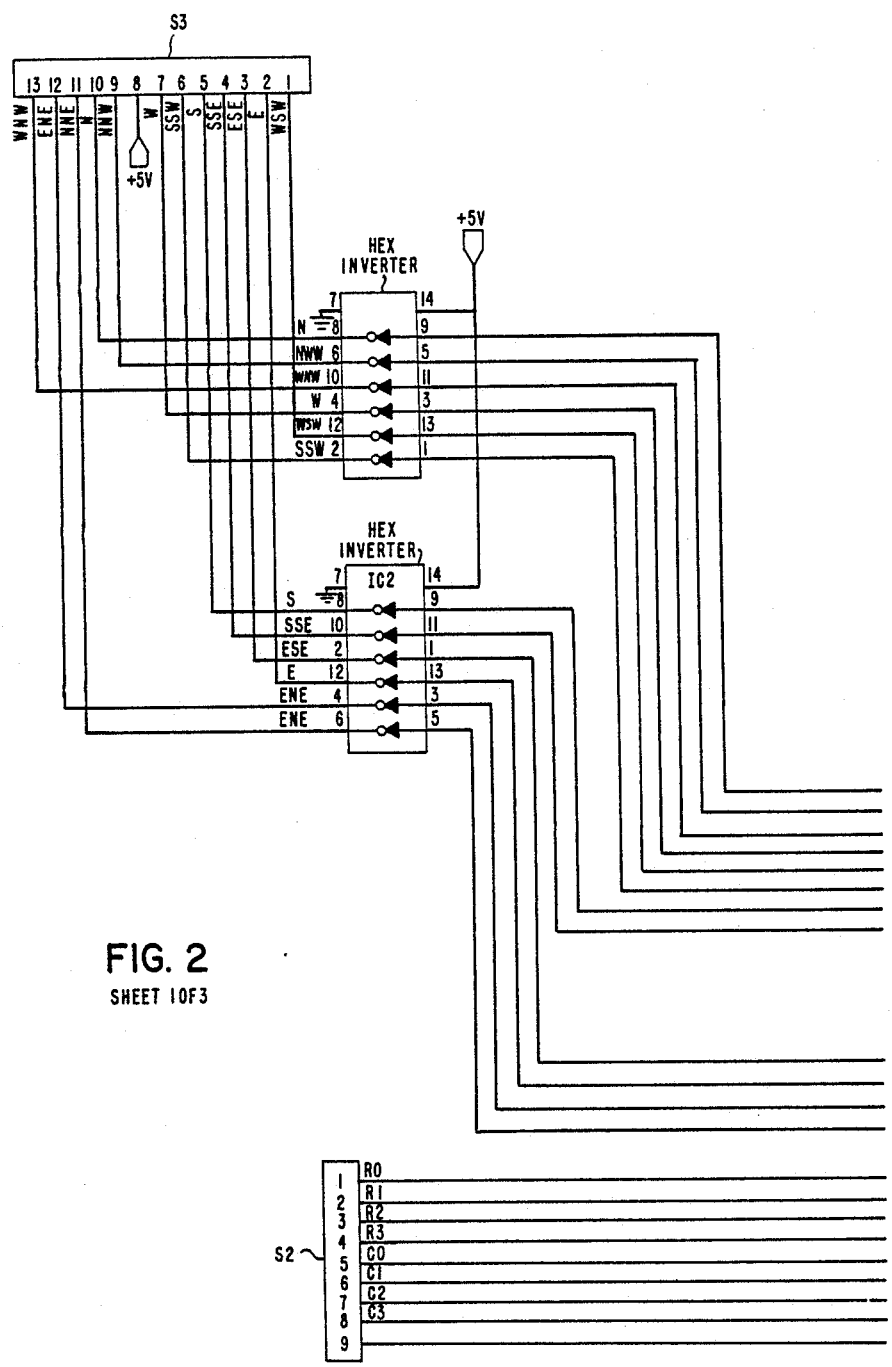
FIG. 2 is a circuit schematic diagram of a main printed circuit board for the one embodiment of the invention.
Figure 2:
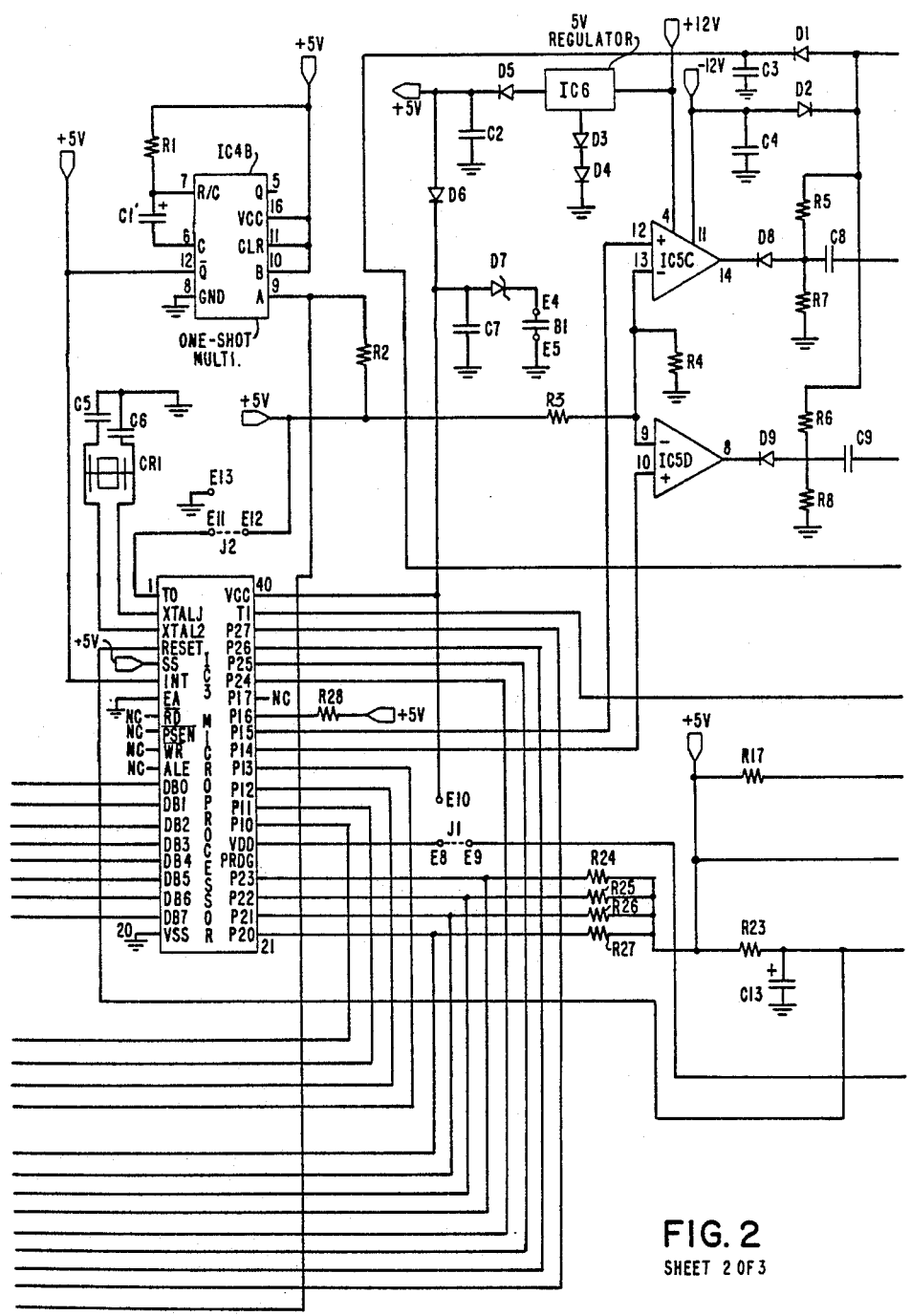
Figure 2:
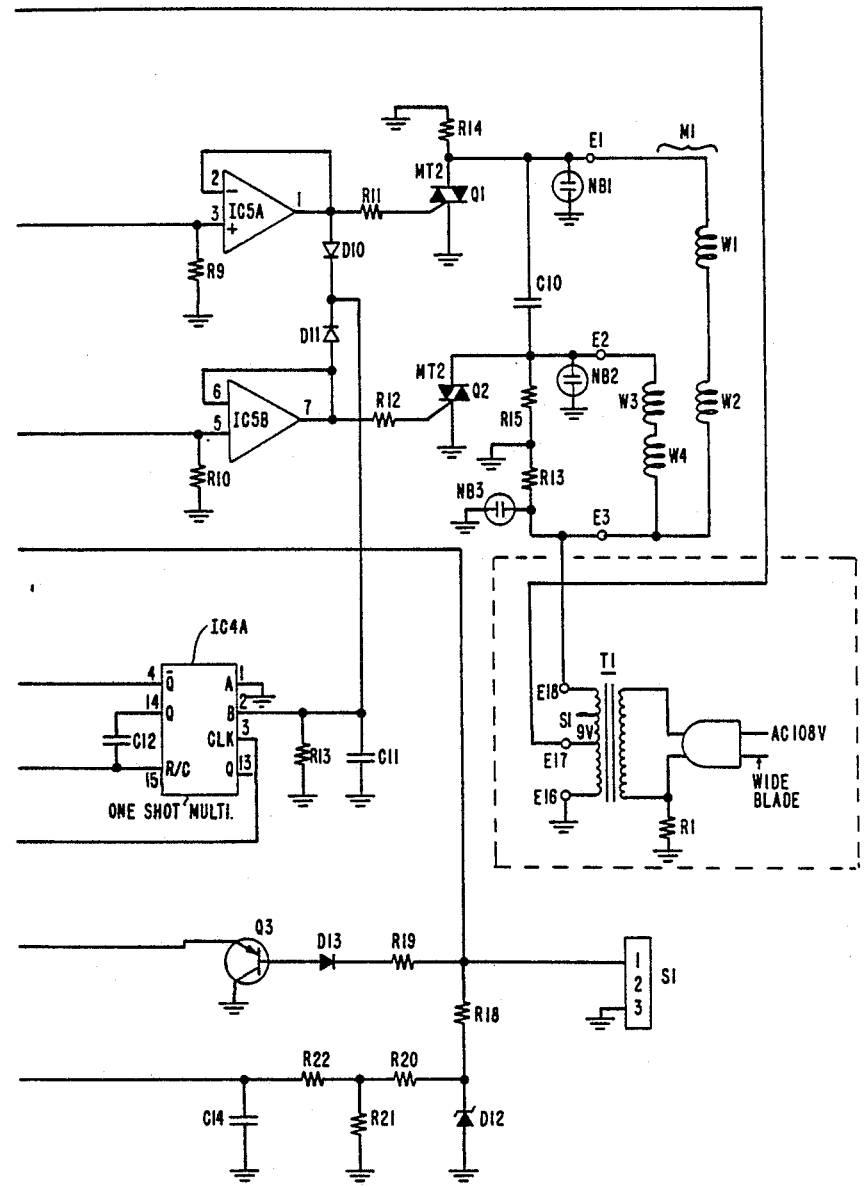

With reference to FIGS. 1 and 2, the present invention includes a rotator motor MI consisting of four windings W1–W4, each two of which (W1, W2, and W3, W4) are connected in series and form opposing poles of the motor M1. The two pairs of series connected windings W1, W2 and W3, W4, respectively, are in turn connected in parallel to achieve a three conductor connection (via terminals E1, E2 and E3) to a control box (contains major circuitry of the system). Notice that if a voltage is applied between terminals E3 and E1 there will exist an equal voltage between terminals E3 and E2. The phase relationship between these two voltages, however, will be shifted by virtue of capacitor C10 located between terminals E1 and E2. Reversing the voltage connection between terminals E1 and E2 reverses the phase relationship of the applied voltage across the windings W1, W2 and W3, W4 of the motor MI. In such a manner it is possible to control the direction of rotation of the rotator motor M1. The value of capacitor C10 is chosen such that the phase shift between terminals E1 and E2 is approximately 90 degrees. Varying the value of capacitor C10 will increase or decrease the amount of slip experienced by the rotator motor M1 and consequently effect the ability of the overall system to perform correctly, inasmuch as the motor M1 will then turn at different speeds in either the clockwise or counterclockwise direction. Notice that capacitor C10 must be non-polarized. The rotator motor M1 is constructed in such a manner that the current drawn by the motor M1 is approximately the same whether the motor M1 is under load, running, or stalled. Furthermore, the rotator motor M1 may be stalled indefinitely wthout damage to the motor M1. This allows a feed forward control of the motor M1. In normal operation the applied voltage between E1 and E3, and between E2 and E3, is 18 volts RMS, 60 Hz, with a maximum current of approximately 800 mA. However, the voltage on the opposing windings (W1,W2 and W3,W4) due to the resonance between capacitor C10 and the motor windings W1–W4, attains a voltage peak higher than that applied. Regardless, the peak voltage available at the output terminals E1,E3 and E2,E3 does not exceed 30 volts.

Power is obtained from the AC line at either 110 or 120 volts, 50 or 60 Hertz, depending upon the intended market of the device. In either case the secondary S1 of the transformer T1 should be capable of supplying 1.0 ampere at 18 volts RMS from terminals E16 and E18. Approximately 300 mA of the 1.0 ampere is tapped at a 9 volt centertap (terminal E17) for use in positive and negative 12 volt supplies, in this example. A ground terminating resistor R1 terminates one side of the primary winding of T1 to ground.

Triacs Q1, Q2 are used to control the application of AC current to the rotator motor M1 terminals E1 and E2. Since a triac functions as a shunt connected silicon controlled rectifier, both positive and negative going pulses of current must be applied to the gate electrodes of each one of triacs Q1 and Q2 to insure their firing on both the positive and negative half cycles of the applied AC voltage. The triacs Q1, Q2 are connected in such a manner as to either connect or disconnect the given terminal E1, E2, respectively, from ground in order that a low voltage triggering pulse may be used. In order to assure the availability of adequate triggering current pulses, operational amplifiers IC5A and IC5B are each used in an impedance buffer configuration for driving the triacs Q1, Q2, respectively. Resistors R11 and R22 (each 100 ohms, in this example) are connected in series between the output of operational amplifiers IC5A and IC5B, respectively, and the gate of their respective triac Q1, Q2 to limit the peak of current of the triggering pulse applied thereto. In order to turn a triac Q1, Q2, off the applied voltage to the gate thereof must be 0 volts DC. This is achieved by capacitively coupling the input of the impedance buffer to a controlled source. Refer, for example, to capacitor C8 and resistor R9 in FIG. 2. In the absence of an AC voltage on capacitor C8, resistor R9 forces the output of amplifier IC5A to zero volts DC, thereby turning the associated triac Q1 off. A similar function is provided by C9 and R10 for amplifier IC5B and triac Q2. A resistive divider of two resistors R5, R7 is used to derive an AC reference source from the 9 volt transformer winding (centertap of S1). This AC voltage is either allowed to drive C8 or be "pulled" to −12 volts by diode D8 and a comparator operational amplifier IC5C. For example, when the noninverting input of comparator IC5C is in excess of +2.5 volts (the inverting reference is obtained by a resistive divider of resistors R3 and R4 from the +5 volt supply), diode D8 is reverse biased and therefore does not affect the application of AC voltage to the non-inverting input of IC5A via capacitor C8. Also note that resistors R6 and R8 form a resistive voltage divider functioning similarly to resistive divider R5, R7, for deriving another AC reference source for either driving via capacitor C9 the noninverting input of IC5B, or being "pulled" to −12 volts via diode D9 and comparator IC5D. Diodes D1 and D2 provide half-wave rectifiers for rectifying the AC voltage developed at the centertap of S1 (between E17 and E16), and capacitors C3 and C4, respectively, serve to filter the rectified voltages. Further note that with greater than +2.5 volts at the noninverting input of comparator IC5D, diode D9 is reverse biased and does not at such times affect the application of AC voltage to the noninverting input of comparator IC5D via capacitor C9.

Connector S1 mates with connector S1' for supplying +12 volts from the main printed circuit board (see FIG. 2) to the display printed circuit board (see FIG. 1). Resistor R18 couples +12 volts to zener diode D12, for in this example providing +6.8 volts, which is divided down via the voltage divider of resistors R20 and R21 to about +0.68 volt, in this example. The +0.68 volts is coupled via resistor R22, and jumper J1 between E8 and E9 to the (PS) VDD pin of microprocessor IC3. A low-pass filter is provided by capacitor C14.

Power up/down sequence timing is provided via R23, C13, Q3, D13, and R19 connected as shown. If pin 1 of S1 goes low, PNP transistor Q3 turns on to discharge C13. When pin 1 of S1 goes high, that is back to +12 volts, Q3 is cut off, and C13 charges up to +5 volts maintaining the CLK (clock) terminal 3 of IC4A "high" or at +5 volts, and one end of pull-up resistors R24–R27 at +5 volts. The other ends of resistors R24 through R27 connect to microprocessor IC3 pins P23, 22, 21, 20, respectively, and via connectors S2 and S2' to the switching matrix KP rows 3,2,1, and 0, respectively. The columns COL0, 1, 2, and 3 of switching matrix KP are connected via connectors S2' and S2 to microprocessor IC3 pins P24–P27, respectively, as shown. Also, a coupling resistor R28 connects +5 volts to pin P16 of microprocessor IC3.

A ceramic resonator CR1, in this example, provides a 4 MHz clock to microprocessor IC3 at the XTAL1 and XTAL2 pins thereof. Also, a resonator CR1 is terminated to ground via stabilizing capacitors C5 and C6.

The combination of jumper J1 and terminals E8, E9, and E10 provide for selection of one of two different microprocessors for use as IC3. With J1 between E8 and E9 a UPD80C49HC can be used for IC3. Alternatively, with J1 between E8 and E10, a UPD8749H can be used for IC3.

If operation of the present rotator system via an infrared remote control interferes with other equipment, or vice versa, jumper J2 and terminals E11, E12, and E13 provide for either configuring microprocessor IC3 to operate in a "bank 6" or "bank 7" configuration. J2 is placed between E11 and E13, to ground pin TO of IC3, for configuring the latter in a "bank 6" select (alternate) mode. Alternatively, J2 is placed between E11 and 12 and connect +5 volts to pin TO, for operating IC3 in a "bank 7" select (default) mode. Other connections for microprocessor IC3 are as shown in FIG. 2. The infrared system used allows 512 individual control codes. One band consists of 64 control codes. The three most significant binary bits of an individual code determines which bank of the 64 codes it is a member.

Since triacs such as Q1 and Q2 can be triggered by an excessive reverse voltage or by a rapidly rising load dV/dT, it is anticipated that surges resulting from lightning strikes on the antenna will trigger triacs Q1 and Q2, effectively shunting away any surge current to ground. In this mode, the triacs Q1 and Q2 act essentially as a varistor. The 100 ohm resistors R11 and R12 in the gate circuits of the triacs Q1, Q2, respectively, provide additional isolation between the remaining circuitry and the surge current. Surge protectors NB1, NB2 and NB3 provide additional lightning protection. Additional safety is provided by ground terminating resistors R13, R14, and R15.

The relative position of the rotator motor M1 is determined by keeping track of the number of cycles of current applied to the windings W1–W4 in each direction. This is accomplished by detecting the positive pulses of trigger current through either diode D10 or diode D11, and further squaring these pulses with one-shot IC4A before applying the pulses to pulse counter input T1 of a microcomputer IC3. There are approximately 3,600 cycles of current required to move the rotator drive (not shown) one complete revolution. The microprocessor IC3 synchronizes itself by initially moving the rotator motor M1 for approximately 3600 cycles of current in the counterclockwise direction to insure that it always reaches a mechanical stop at the end of the clockwise direction of travel. From this point, the microprocessor IC3 then keeps track of cycles of current applied in each direction in its internal RAM (random access memory not shown) and provides for high and low limit stops as well as programmable selection of any given direction, as will be described below. Synchronization of the microprocessor IC3 is accomplished by pressing the "SYN" key on the microprocessor keypad KP (see FIG. 1) on the front panel (not shown). Note that the keypad KP is connected via connector S2' to the control circuitry connector S2.

The microcomputer IC3 receives instructions via a 4×4 keypad matrix KP which allows for 11 preprogrammed positions via switches labelled "A" thru "K", "SYN" (synchronization), "CW" (manual clockwise), or "CCW" (manual counterclockwise) motion, "MEM" (memory function), and a "DISY" (display or recall) function. The keypad KP is located on a front panel (not shown). The flowcharts of FIGS. 4 through 7 show the programming of the microprocessor IC3 for carrying out various system operations. Note that the various counters called out in the flowcharts are all internal to microprocessor IC3.

Figure 3:
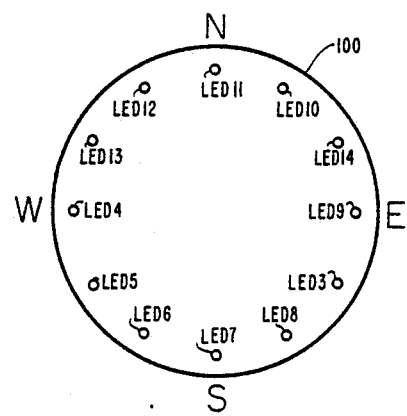
FIG. 3 shows the layout of LED indicators on a front panel in one embodiment of the invention.

Also located on a front panel (not shown) are light emitting diodes LED 3 thru LED 14 (see FIG. 1) for providing a relative indication of the direction of rotation of the antenna (not shown) by motor M1. As shown in FIG. 3, the LEDs are arranged in a circle for simulating a compass, in this example. Each LED 3-14 represents twelve equal increments of arc. During motion of the rotator the microprocessor IC3 effectively indicates an additional 12 directions by lighting the LED's in an overlapping manner. Thus, for example, LED 11 is on at true north (designated N), LED 10 and LED 11 are both on as the rotator motor M1 (see FIG. 2) moves the antenna clockwise away from true north towards the east. Ultimately LED 10 alone is on (indicating "NNE" for north northeast), then overlapping to LED 10 and LED 14 together, LED 14 alone, and so forth, as the antenna rotates. Hex inverters IC1 and IC2 are used as LED drivers (see FIG. 2). Note that in FIGS. 1 and 3, for LEDS 3-14, the directional coding "W" designates west, "S" south, "E" east, and "N" north. Accordingly, LED 13 lights to indicate west northwest, for example. Also, current limiting resistors R7'-R18' are individually associated with each one of the LEDS 3-14, respectively. The hex inverters IC1 and IC2 operate to ground the resistors R7'-R18' at appropriate times for drawing current from +5 volts through the associated one of LEDS LED 3-14, respectively. Also note that connectors S3 and S3' interconnect LED 3-LED 14 from a control box (not shown) enclosing the main printed circuit board components of FIG. 2, to the front panel (not shown) housing the display printed circuit board components of FIG. 1, respectively.

Infrared (IR) remote control is provided, via photodiode D2' (see FIG. 1) for detecting the presence of infrared radiation by emitting a signal, which is subsequently amplified and limited by preamplifier IC1'. In the preferred embodiment, diode D2' should be shielded from direct exposure to overhead room lighting, e.g., the window of the housing (not shown) for the system should be on a vertical side of the housing, not the top. Remote operation is provided via a hand-held transmitter 200, in this example.

Note that a blocking diode D1' connects pin 3 of preamplifier IC1' to pin 9 (via S2, S2') of one-shot IC4B. Also, with respect to preamplifier IC1' capacitor C1' provides gain control, and capacitor C6' sets the operating point. A twin-T filter for IC1' is provided by resistors R1', R2', R3', and capacitors C2', C3', and C4. The IR signal detected by diode D2' is applied to preamplifier IC1' via emitter follower Q1'. Relative to the emitter follower Q1', resistor R6' and capacitor C8' provide a low-pass filter, capacitor C7' a high frequency filter, R4' and R5' a resistive voltage divider for biasing PNP transistor Q1', and a DC blocking capacitor C5' for AC coupling Q1 to preamplifier IC1'. Note that capacitor C10' provides a high-frequency bypass filter.

A pulse modulated signal of approximately 31.25 kilohertz is available at pin 3 on IC1, and the envelope of this signal is detected by a retriggerable one-shot IC4B (see FIG. 2), which is immediately triggered on the falling edge of the output pulse of the IR preamplifier IC1'. The output pulse width of the one-shot IC4B is approximately 128 microseconds, and is determined by the values of resistor R1 and capacitor C1. Pull up resistor R2 insures that pin 9 of IC4B does not inadvertently trigger an output pulse. A typical "on" time for the infrared transmitter is 512 microseconds. An "on" burst consists of individual infrared pulses. Since each pulse of the IR carrier is approximately 32 microseconds wide, a continuous pulse of approximately 640 microseconds (512 microseconds + 128 microseconds = 640 microseconds) is generated by the one-shot IC4B, in this example. Allowance for skewing of the NRZ (non-return to zero) duty cycle is provided for in a detection algorithm (see flowchart of FIG. 4). The elongated pulse of the one-shot IC4B allows generation of jitter-free NRZ codes under conditions of weak IR signals even when only a few of the carrier pulses in an IR burst are detected. The microcomputer or microprocessor IC3 is constantly scanning these pulses to check for valid Manchester NRZ codes. An extensive error detection alogorithm (see flowchart in FIG. 7) is implemented to insure that only valid codes are received, while at the same time allowing for a selfclocking of the data to be accomplished to provide a large degree of immunity from carrier frequency drift. Typically, the normal mode of operation of the present rotator system will be in programmed movement of the antenna, wherein it is only necessary for the microprocessor IC3 to receive a single valid instruction to accomplish the desired positioning of the antenna. In manual motion (depression of "CW" or "CCW" keys of keypad KP), it is necessary for the microprocessor IC3 to detect only 1 of approximately 6 valid instructions to provide smooth control of the antenna. If the infrared signal is totally obscured, an internal time-out period of 600 milliseconds is provided to ensure that the present system will not be inadvertantly rotating the antenna in a uncontrolled manner.

Another one-shot multivibrator IC4A has its output pulse width controlled by the values of resistor R17 and capacitor C12, connected as shown. The function of one-shot IC4A is to provide a pulse with rapidly rising edges in response to each cycle of current applied to triacs Q1 or Q2. This pulse taken at pin 4 of IC4A is subsequently applied to microprocessor IC3 pin 39 counter input. The rapidly rising edge assists in error-free counting of pulses by the microcomputer.

The microcomputer IC3 can operate without battery backup, due to a partial degree of freedom from line transients and brief power outages provided by a 47 microfarad capacitor C2 at the output of the +5 volt regulator IC6, for example. In the event that no battery backup is present, and the power outage exceeds the backup voltage time available from capacitor C2, resynchronizaton of the microprocessor IC3 is accomplished by pressing the snych ("SYN") button. In such a case, programmed positions A thru K must also be reprogrammed. Also, if excessive wind loading at the antenna moves the rotator motor M1, it will be necessary to resynchronize the microprocessor IC3 to provide optimum repositioning accuracy. Battery backup is obtained by the 9 volt battery B1 in conjunction with zener diode D7. Note that capacitor C7 provides a high-frequency bypass for filtering zener noise, for example. During a power down sequence, the microprocessor IC3 will retain its internal memory contents as long as the voltage at pin 40 remains above +2 volts DC at a maximum current drain of approximately 10 microampere. Diode D6 provides isolation from other current consuming portions of the +5 volt circuitry. A power down sequence is achieved by diode D5 and capacitor C2 at the output of the +5 volt regulator IC6, and the circuitry (described below) associated with the NOT RESET pulse and the NOT POWER SAVE pulse. These circuits effectively detect the absence of +12 volts quickly enough to reset the microprocessor IC3 and place the $\overline{(PS)}$/VDD pin thereof in the power down mode. Upon reapplication of +12 volts these same circuits insure that the +5 volt supply is stable before reinitiating the microprocessor IC3 function. Under conditions of an extended power outage, all functioning of the microprocessor IC3 will return to normal without resynchronization or reprogramming as long as the battery B1 can supply a total of at least 6.3 volts at 10 microampere, in this example. Diodes D3 and D4 associated with +5 V regulator IC6 raise the output thereof to compensate for the series voltage drop of diodes D5 and D6.

Pressing the display ("DISY") key on the keypad causes the (one or two) LEDS of LED's 3 through 14 corresponding to the present antenna direction or position to be illuminated for approximately 3 seconds, in this example.

The antenna is manually positionable by pressing the clockwise ("CW") or counterclockwise ("CCW") keys on the keypad KP to accomplish a manually controlled movement of the antenna rotor via motor M1. Once a desired position is reached, this position may be stored by pressing the memory ("MEM") key. At this time the position indicating LED of LED 3-14 corresponding to the current antenna direction will flash on and off at a 2 Hz rate until a key A thru K is pressed. If a key A thru K is not pressed within 10 seconds, the microcomputer IC3 is programmed to assume that the memory key was pressed in "error", whereby the memory sequence will be ignored. Pressing one of keys A thru K after pressing memory ("MEM") causes the microcomputer IC3 to store in memory the number of pulses corresponding to the current position, and subsequently to move the antenna to that same position whenever the one of keys A thru K is pressed again. In order to move the antenna to a preprogrammed location it is only necessary to press one of the keys A thru K. The microcomputer IC3 is programmed to respond by outputting commands for automatically repositioning the antenna (see flowchart of FIG. 4 for "MAIN PROGRAM"). Once the microcomputer or microprocessor IC3 is in the process of carrying out a desired instruction such as, positioning the rotator motor M1 to rotate the antenna to position A, for example, pressing another function key on keyboard KP will cause the microprocessor IC3 to stop its current operation, pause for one second, and proceed to carry out the new instruction. The one second pause allows the rotator motor M1 to come to a complete stop so that no pulses are missed in the event that the direction of rotation needs to be reversed. Also, note that in practice some slippage occurs during the electrical braking or reversal of current of the motor M1.

Infrared code allocations are contained in a separate table. Selection of the infrared code bank as either a 6 or a 7 can be accomplished either at the factory or in the field. Furthermore, it is possible that the code bank on both a handheld IR transmitter unit 200 (such as one employing Siemen's infrared transmitter IC#SDA2208-2) and the antenna rotator (part of M1) could be changed in the field in the event that a customer had a problem of interference with some other manufacturer's infrared controlled equipment that happened to be operating at the same frequency and with the same NRZ code as used for the present system.

A description of the programming of microprocessor IC3, and of other details of the operation of the present invention now follow. Upon power up of the antenna rotator system, an internal RAM location of the microprocessor IC3 is tested for a verification pattern to determine if the present rotator system is in an initial power on sequence (see FIG. 4). If a verification pattern is not stored in the RAM location, initial power on is assumed, diagnostics (see flowchart of FIG. 7) are performed and RAM (part of IC3) initialization is performed as follows: RAM verification is stored in a RAM memory location, current rotator positions for programmed locations are preset (see below for prestored programmed locations), ports and bus data are initialized, and all other internal RAM is cleared. If a verification pattern is detected, these initialization procedures are by-passed.

Every power on sequence will blank position and direction LEDS 3-14. External interrupts are enabled to allow infrared data entry, if desired (see flowchart of FIG. 6). Internal interrupts (see flowchart of FIG. 5) are also enabled at this point to allow processing of any keyboard KP or infrared instructions.

The keyboard KP is scanned four times to allow key debounce of data entry. On each scan the data will be ANDed to the data read on the previous scan. At the end of four scans a code will be returned to allow error detection, and so forth.

Upon receiving a valid keyboard KP instruction, the column and row coordinates of the keyboard KP data are used to address a lookup table (not shown) to convert a keyboard KP instruction into an equivalent infrared instruction code. Between each keyboard KP scan a test for a valid infrared code is performed. If no infrared code is present external interrupts are again enabled to allow infrared entry.

To reduce errors from infrared transmission, a time out counter within microprocessor IC3 is set up to send an "end instruction". If a valid keyboard or infrared code is not received in the set amount of time (600 milliseconds), an end instruction will force the present rotator system to end any current function processing. The time out counter is reset to permit continuous time outs. After a valid code has been received from either the keyboard KP or from an infrared transmitter, external interrupts (infrared) are disabled and the program code is used to determine the instruction and set appropriate flags.

The sampling of infrared data and determination of infrared instructions will now be described. Using a sampling rate of 56.25 microseconds, 240 bits are read for ensuring the complete reading of infrared instruction bits (56.25 microseconds×240=13.5 milliseconds reading time). Total transmission time of infrared data is 13.312 milliseconds.

The sampling rate was calculated as follows:
1. The loop to sample one data bit takes 15 instruction cycles and using a 4 MHz clock, one instruction cycle is 3.75 microseconds. Therefore 15×3.75 microseconds=56.25 microseconds (sampling rate).

2. This sampling rate allows approximately 18 samples per data bit. There is approximately 1024 microseconds between data bit transmissions, therefore 1024 microseconds divided by 56.25 microseconds (sampling rate) equals 18.2 samples taken between data bits.
3. Total infrared code transmission time is approximately 13.312 milliseconds. To obtain the total number of samples needed to ensure all bits are detected, the following calculation is made: 13.312 milliseconds (total transmission time)/56.25 microseconds (sampling rate)=236.6 bits must be samples, for example.
4. Round off the total number of bits to be sampled (236.6) to the nearest 8 bits=240 samples. This sets the total sampling time to 240×56.25 microseconds=13.5 milliseconds, in this example.

The following conditions, for example, must be met before a valid infrared code is assumed:
1. A precondition pulse of at least eight (8), but not more than twelve (12) zeros must be present.
2. Following the precondition pulse, "quiet" time must occur in which at least thirty-seven (37), but not more than forty-four (44) ones must be present.
3. After the quiet time a series of at least eight (8), but not more than twelve (12) zeros must be present before the start bit transition to a one (start bit must equal a one).
4. After the start bit transition, nine data bits must occur on bit 15, 16, 17, 18, 19, or 20. At the time of transition, at least six consecutive bits (including the transition bit) must have the same value.

The new reference point for the next data bit is the transition point. A "mark" to "space" sets infrared data bit=0. A "space" to "mark" sets infrared data bit=1. After the start bit plus the nine data bits have been detected, the remaining data is ignored. Testing is complete. However, if at any time during infrared data test, the above conditions are not met, an invalid code is assumed and testing will stop.

An example of a valid infrared transmission is as follows:
(1) Precondition pulse=9 zeros.
(2) Quiet time=40 ones.
(3) Number of zeros after quiet time, but before start bit transition=10 zeros.
(4) There are at least six bits having the same value after each bit and start bit transition.
(5) Data transitions occur on bits 15, 16, 17, 18 or 19.
(6) This particular code will be decoded as 0000101001 (display command).

Prestored programmed locations are used in the present system. For example, on power up initialization of programmable antenna rotation, programmed move locations are stored as follows:

| POSITION KEY | NUMERICAL LOCATION OF STORED POSITION | COMPASS DIRECTION | LED TO BE LIT UPON PROGRAMMED MOVE TO LOCATION |
|---|---|---|---|
| A | 3480 (high limit) | North | Led 11 |
| B | 3040 | NW | Leds 12 and 13 |
| C | 2608 | West | Led 4 |
| D | 2176 | 5W | Leds 5 and 6 |
| E | 1968 | 55W | Led 6 |
| F | 1744 | South | Led 7 |
| G | 1312 | SE | Leds 3 and 8 |
| H | 880 | East | Led 9 |
| I | 448 | NE | Leds 10 and 14 |
| J | 240 | NNE | Led 10 |
| K | 0 | North | Led 11 |

Operation of the present antenna rotator system is initiated the first time of use by synchronizing the system. When the "SYN" synchronization key is pressed, counterclockwise movement of motor M1 is performed to synchronize the present antenna rotator system. During the synchronization movement, the position LEDS LED 3–14 on a compass face 100 (see FIG. 3) will be lit to indicate the antenna position, as previously described. When synchronization is complete, LED 3 through led 14 will be turned off, and the rotator will stop the antenna in the north position.

When the clockwise "CW" or the counterclockwise "CCW" keys are pressed, the antenna rotator motor M1 will move in the desired direction until the key is released or the rotator motor M1 can no longer move in that direction (high or low limit has been reached). During manual movements, position LEDs LED-3–LED14 on the compass face 100 will be selectively lit to indicate the relative antenna position and direction of movement, as previously described. After the depressed one of the "CW" or "CCW" keys are released, the lit one or ones of the position LEDs will be turned off, indicating that the antenna is now stationary.

In order to store a desired position in memory (preprogram the position), a manual clockwise or counterclockwise move is performed to position the antenna rotator to the desired position. Next, a memory "MEM" key is pressed. The current position LEDs on the compass face 100 will blink to prompt for the entry of a programmed location key (A thru K). The user must next choose which programmed location (A thru K) to store the desired rotator position by pressing one of keys A thru K. If a programmed location key (A thru K) is not pressed within ten seconds, any lit ones of LEDs LED 3–14 are extinguished. Thereafter, whenever a programmed location key (one of A thru K) is pressed (not preceded by a memory key entry), the antenna rotator LED 3–14 will automatically move the antenna to the position previously stored at the selected memory location. Position LEDs LED 3–14 on the compass face 100 will be lit according to position. When the desired position is reached all lit ones of LEDs LED 3–14 will extinguish.

A prototype system of the present antenna rotator system was constructed. In this prototype, the microprocessor IC3 is a UPD80C49HC manufactured by NEC. Also, voltage regulator IC6 is an MC7805; comparators IC5A–D are provided by a LM324; triacs Q1 and Q2 are each T2323F triacs; one-shot multivibrators IC4A and IC4B are provided by a 74LS123 manufactured by Motorola; Q3 is a 2N3906; preamplifier IC1' is a Siemens TDA4050; PNP transistor Q1' is a 2N3906; IR detecting diode D2' is a BPW41; and hex inverters IC1 and IC2 are each a 74LS04. Note that in FIGS. 1 and 2, pin numbers for the integrated circuit components are shown. Where specific manufacturers are not stated, it is implied that part numbers shown are "industry standard".

Figure 4:
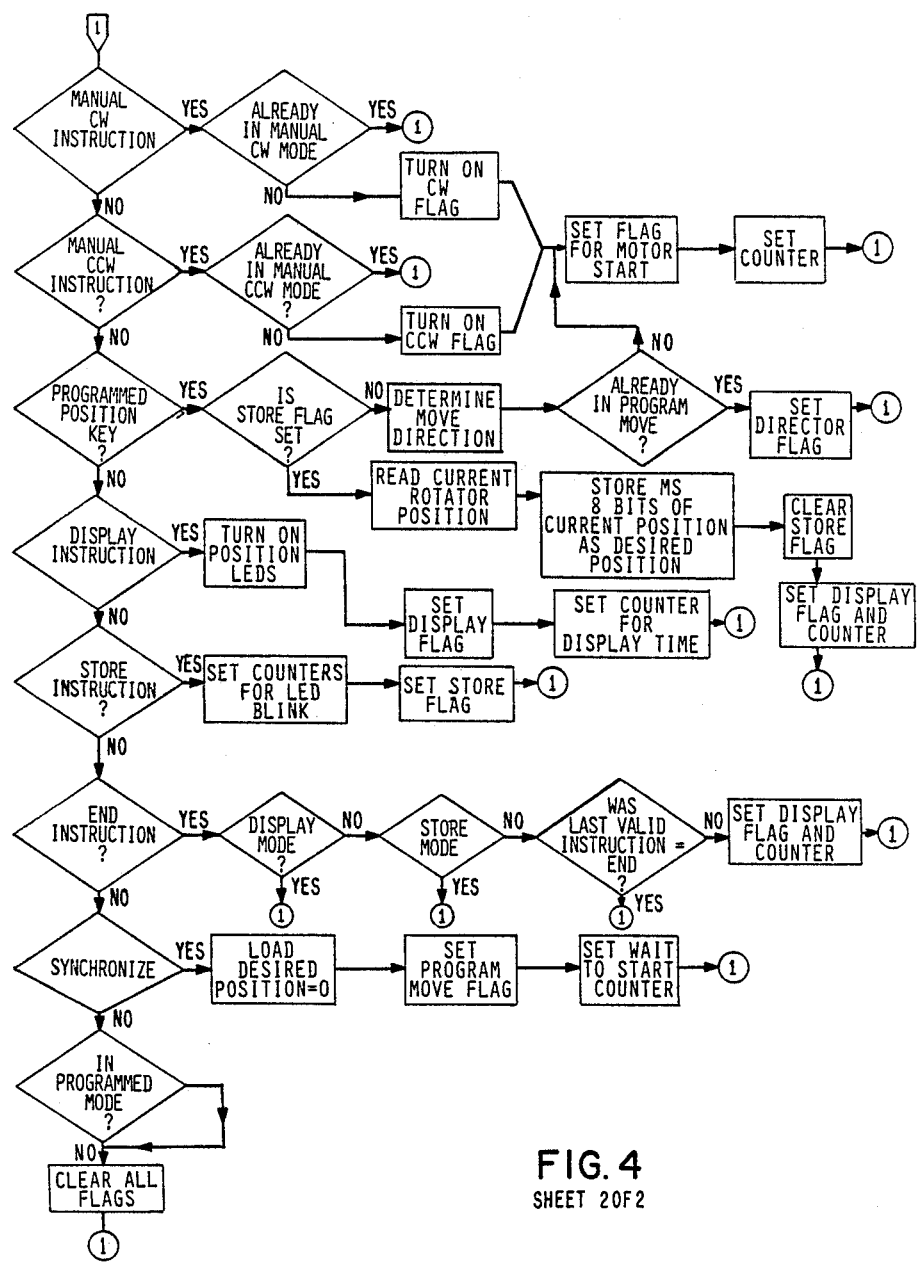
FIGS. 4 through 7 show flowcharts for the MAIN PROGRAM, INTERNAL INTERRUPT ROUTINE, INFRARED EXTERNAL INTERRUPT ROUTINE, and DIAGNOSTICS ROUTINE, respectively, of one embodiment of the invention.
Figure 5:
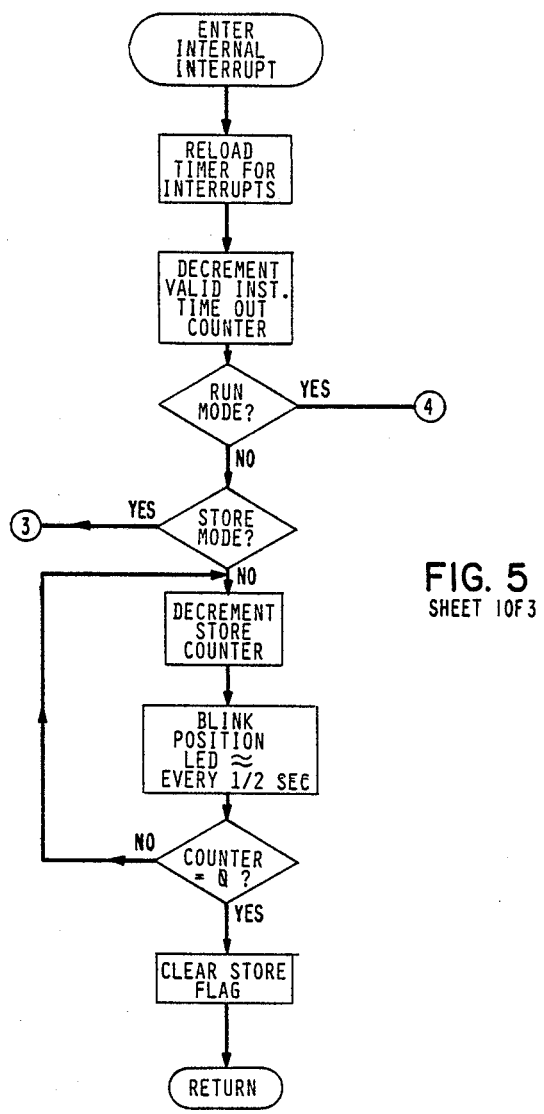
Figure 5:
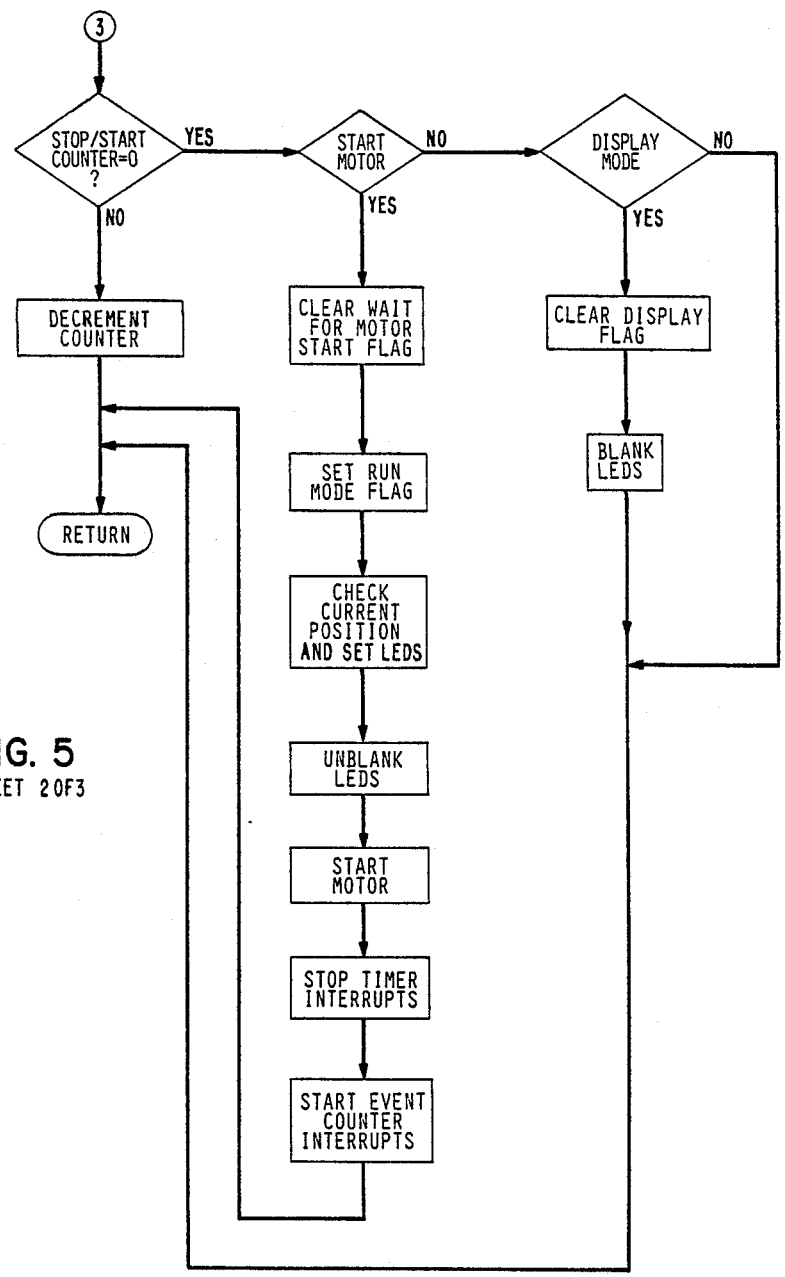
Figure 5:
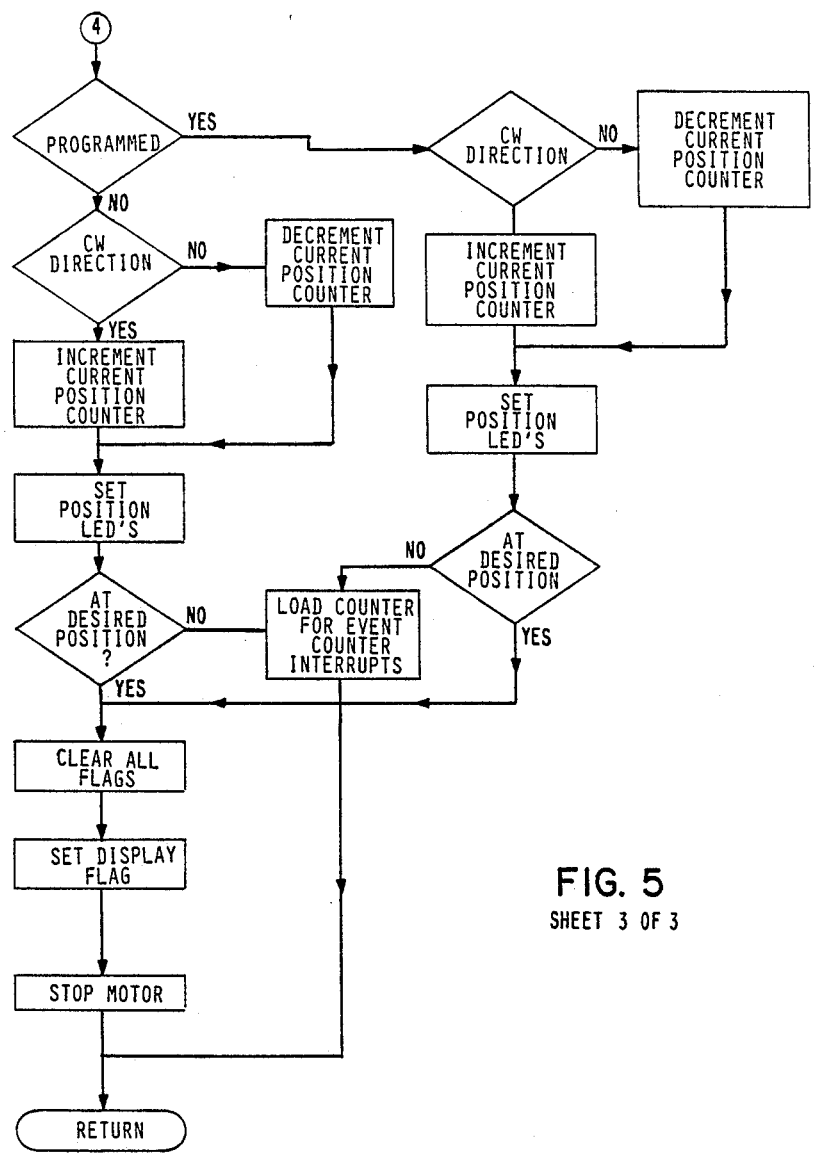
Figure 6:
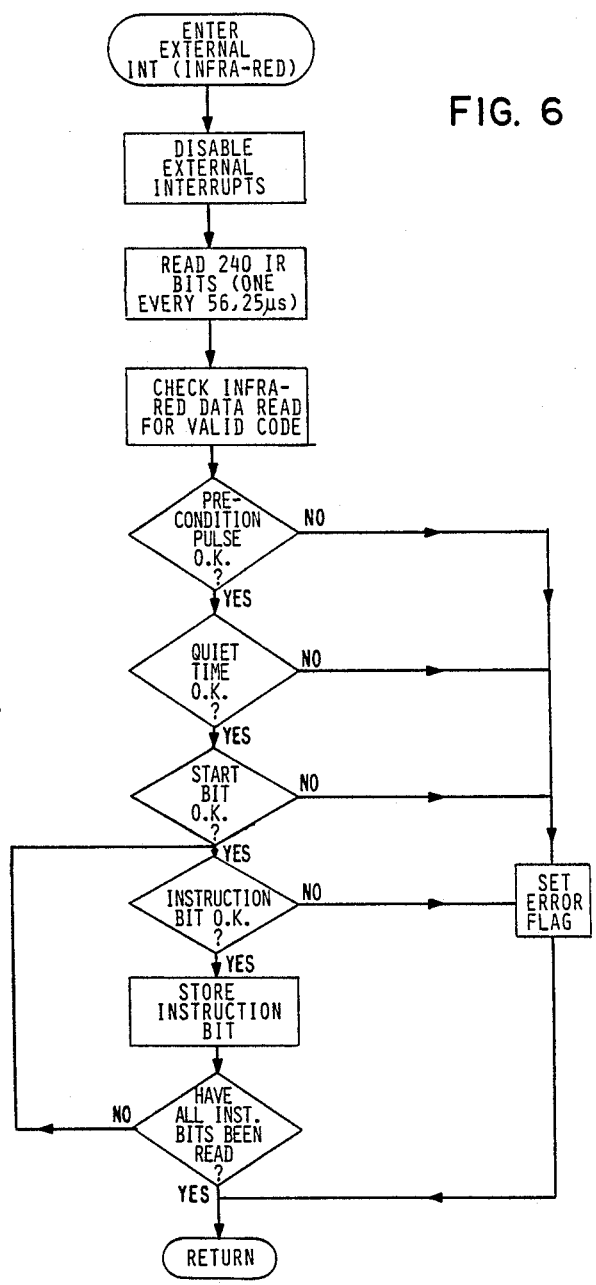
Figure 7:
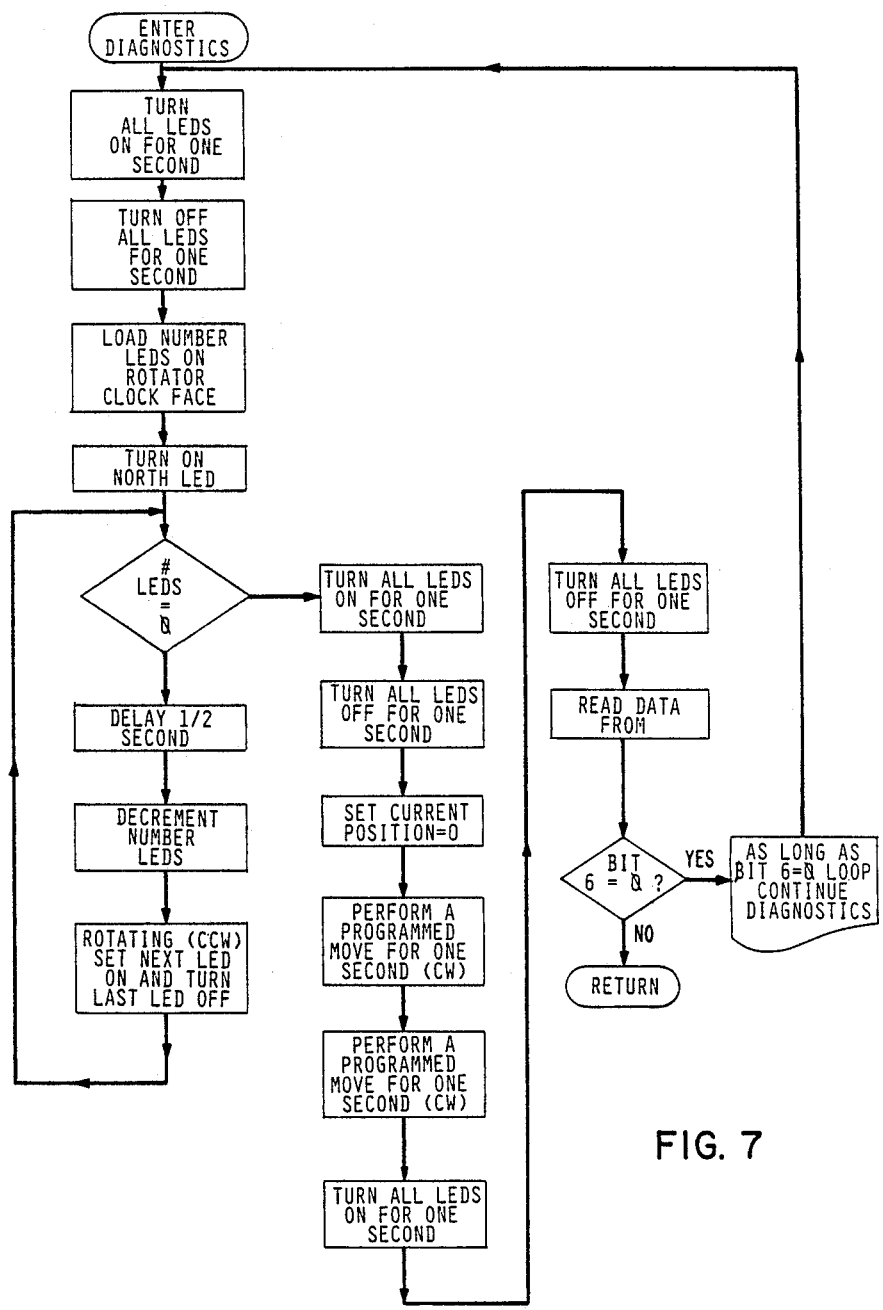

Operation of the rotator system for moving an antenna (not shown) from one preprogrammed position will now be described, with reference to FIGS. 1 and 2 and the flowchart of FIG. 4 for the Main Program. Assume the antenna is in the "north" position. Further assume a key or keypad KP for rotating the antenna to the "east" position is depressed. Assume that this key is key A preprogrammed for "east". Microcomputer IC3 executes the stored program in its internal read only memory (ROM) to ascertain that the rotator must move in the clockwise (CW) direction. Microcomputer IC3 then sets its output pins such that IC5 pin 12 is greater than 2.5 volts and IC5 pin 10 is less than 2.5 volts. In accordance with the previously described circuit operation, voltage is applied between E3 and E2 and E3 and E1 in such a phase relationship as to cause the motor M1 to move in the CW direction.

During the course of movement by M1, microcomputer IC3 counts cycles of current applied to the motor M1 as previously described. When the number of pulses accumulated in the up/down counter internal to IC3 equals that stored in the internal RAM of IC3 as corresponding to "E", the microcomputer IC3 causes pin 12 of IC5 to be below 2.5 volts, and movement of the motor M1 ceases in accordance with the previously described circuit operation.

Throughout the course of movement by M1, the microcomputer IC3 turns on and off LEDs 3-14 as required to indicate the current position of M1.

Operation of the present antenna rotator system via a remote handheld control 200, such as one incorporating Siemens IR transmitter chip SDA-2208, for moving the antenna from "N" to preprogrammed "E" follows as a similar process, with the exception that operation is initiated by an infrared transmission. Such transmission is detected by diode D2, amplified by IC1, envelope detected by IC4B, and analyzed by microcomputer IC3 in accordance with previously described circuit operation.

Although various embodiments of the present invention have been shown and described above, such description is not meant to be limiting, and variations of the invention as herein described may occur to those skilled in the art which remain within the scope and spirit of the appended claims. For example, rather than using a microprocessor IC3, another embodiment of the invention may include hard-wired logic, such as a gate array, rather than a stored program to accomplish the same algorithm or control function.

What I claim is:

1. In a system for automatically rotating an antenna to any one of a plurality of preprogrammed positions via operation of either different ones or combinations of keys of a keypad, the preprogramming method for said system comprising the steps of:

(A) synchronizing said system to a datum position via rotation of said antenna to a known reference position;

(B) manually operating said system via said keypad for rotating said antenna to stop at a desired position;

(C) storing in memory via operating of said keypad the desired position of said antenna for subsequent automatic selection;

(D) repeating steps (B) and (C) for storing in memory each one of said plurality of preprogrammed positions;

(E) selecting from memory via said keypad one of said preprogrammed positions;

(F) automatically rotating said antenna to the selected preprogrammed position under control of said microprocessor; and (G) detecting a signal from a remote control device for manually operating said system to rotate said antenna to a desired position.

2. The method of claim 1, further including the step of:

indicating remotely the changing positions of said antenna during its rotation from one position to another.

3. The method of claim 1, wherein said detecting step includes detecting an infrared signal.

4. A system for automatically or manually controlling the rotation of an antenna from one position to a desired new position, comprising:

a motor for rotating an antenna;

means for energizing said motor;

keypad means including a plurality of keys encoded for individually permitting either (1) selection of manual energization of said motor to rotate said antenna from one position to another, or (2) selection of a preprogrammed position for automatically rotating said antenna to the preprogrammed position, or (3) preprogramming of at least one position to which said antenna is "manually" moved, for obtaining subsequent automatic selection of the position; and controller means including memory means for storing said preprogrammed position, said controller means being responsive to (1) continuous depression of either a "CW" or "CCW" encoded key of said keypad means for operating said energizing means to energize said motor for rotating said antenna in either a clockwise or counterclockwise direction to a desired position, respectively, (2) to momentary depression of a memory ended key subsequent to stopping said antenna at the desired position, for priming said keypad means to next permit momentary depression of a position key for storing the coordinates of the desired position in said memory means, and uniquely designating said last depressed position key to represent the now preprogrammed position, and (3) to subsequent momentary depression of any one of the previously preprogrammed position keys for automatically operating said motor energization means to rotate said antenna to the preprogrammed position, respectively; and indicator means of remotely either (1) providing a visual indication of the position of said antenna as it is being rotated from one position to another, or (2) being responsive to depression of a "display" key on said keypad means for momentarily indicating the rest position of said antenna at that time.

5. The antenna rotator system of claim 4, wherein said motor includes:

a first pair of series connected windings;

a second pair of series connected windings; and a capacitor connected in series with said second pair of windings, the combination of said second pair of windings and said capacitor being connected in parallel with said first pair of windings, said capacitor causing an approximately 90° phase shift between a voltage applied across said first and second pairs of windings via said energizing means.

6. The antenna rotator system of claim 5, wherein said energizing means includes:
a source of reference potential;
a source of AC voltage connected between the common ends of said first and second pairs of windings, and said source of reference potential;
first switching means responsive to signals from said controller means for connecting the other end of said first pair of windings and said source of reference potential for rotating antenna in one direction; and
second switching means responsive to other signals from said controller means for connecting the other end of said second pair of windings to said source of reference potential, for rotating said antenna in an opposite direction.

7. The antenna rotator system of claim 6, wherein said first switching means includes:
a triac having a main current path connected between the common connection of said capacitor and first pair of windings, and said source of reference potential, and a gate electrode; and
processing means for processing said signals from said controller means, for developing a control signal for application to the gate electrode of said triac, for turning the triac on to substantially reduce the impedance of its main current path.

8. The antenna rotator system of claim 6, wherein said second switching means includes:
a triac having a main current path connected between the common connection of said capacitor and second pair of windings, and said source of reference potential, and a gate electrode; and
processing means for processing said signals from said controller means, for developing a control signal for application to the gate electrode of said triac, for turning the triac on to substantially reduce the impedance of its main current path.

9. The antenna rotator system of claim 4, wherein said keypad means includes a plurality of individual switches connected into a switching matrix, each switch being associated with an individual one of said plurality of keys, respectively.

10. The antenna rotator system of claim 9, wherein each one of said plurality of switches is operable via depression of its associated key for indicating a given row and column of said switching matrix to said controller means.

11. The antenna rotator system of claim 4, wherein said controller means includes a microprocessor.

* * * * *